United States Patent [19]
Gundy

[11] 4,208,154
[45] Jun. 17, 1980

[54] CORE DRILL

[76] Inventor: William P. Gundy, 5000 Brock St., Montreal, Quebec, Canada, H4E 1B6

[21] Appl. No.: 888,738

[22] Filed: Mar. 21, 1978

[51] Int. Cl.$^2$ .......... B23B 51/04

[52] U.S. Cl. .......... 408/204; 125/20; 175/330; 408/145

[58] Field of Search .......... 408/204, 144, 145, 207, 408/206; 51/209 R, 206.4, 204; 407/30; 125/20; 175/330, 403

[56] References Cited

U.S. PATENT DOCUMENTS

| | | | |
|---|---|---|---|
| 922,640 | 5/1909 | Williams, Jr. et al. | 175/330 X |
| 1,676,887 | 7/1928 | Chamberlin | 175/403 |
| 2,326,908 | 8/1943 | Williams, Jr. | 125/20 |
| 2,343,793 | 3/1944 | Paget | 175/330 X |
| 2,358,460 | 9/1944 | Kelleher | 51/204 X |
| 2,552,485 | 5/1951 | Howard et al. | 51/209 R X |
| 3,127,715 | 4/1964 | Christensen | 51/209 R |
| 3,146,561 | 9/1964 | Lindblad | 51/206.4 |
| 3,176,675 | 4/1965 | Bomba | 51/206.4 X |
| 3,243,924 | 4/1966 | Peters | 51/209 R X |
| 3,338,230 | 8/1967 | Lindblad | 51/206.4 X |
| 3,494,348 | 2/1970 | Lindblad | 51/209 R X |
| 3,537,538 | 11/1970 | Generoux | 175/330 |
| 3,610,768 | 10/1971 | Cochran | 125/20 |

FOREIGN PATENT DOCUMENTS

| | | | |
|---|---|---|---|
| 1317937 | 1/1963 | France | 175/330 |
| 80110 | 4/1948 | Netherlands | 125/20 |
| 579404 | 12/1977 | U.S.S.R. | 175/330 |

*Primary Examiner*—William R. Briggs
*Attorney, Agent, or Firm*—Larson, Taylor and Hinds

[57] ABSTRACT

Improved core drills and core drill elements. The core drill is of the type having a carrying drill tube and at least one cutting element attached to one end of drill tube. In the present invention, structural means are provided on one end surface of the cutting element extending over the entire length of the end surface to receive all or a portion of the one end of the drill tube to strengthen the core drill. The invention is also directed toward a method for making the improved core drill and a method for reconstructing it. The cutting elements can be curved or straight.

1 Claim, 10 Drawing Figures

CORE DRILL

This invention is directed toward improved core drills.

The invention is also directed toward improved core drill components, an improved method of constructing a core drill, and an improved method of reconstructing a core drill.

Core drills are used primarily for drilling holes in hard material, such as reinforced concrete and masonary, and are well known in the art. Examples of known core drills are shown in U.S. Pat. Nos. 2,326,908; 2,996,061; 3,153,885; 3,495,359; 3,692,127 and 3,778,179.

The core drills, as shown in the patents, generally comprise a carrying drill tube with hardened cutting means carried at one end of the tube. The hardened cutting means is made from diamond chips, or other hard cutting material, held together by suitable bonding material.

A problem with known core drills, particularly those of the type shown in U.S. Pat. No. 2,996,061 for example, is that the cutting means frequently breaks off from the tube during use. Also, assembly of the cutting means to the tube can be difficult. It is important to position the outer, circular cutting surface of the cutting means accurately with respect to the tube. Special jigs, which are expensive, are usually required to obtain the accurate positioning prior to joining the cutting means and tube together by welding, brazing or other suitable means. To minimize the possibility of the cutting means breaking off, it is known to provide structural means in the joint between the cutting means and tube which resist shearing, as shown in U.S. Pat. No. 2,326,908. However, these tongue and groove structural means are expensive to machine and/or form in both the cutting means and the carrying tube. In addition, in this particular patent, the cutting means, having these structural means, are difficult to replace since the holding screws for the cutting means become worn or jammed and new screw thread holes are usually required. Further the screws do not provide as strong a connection as brazing over the entire length of the cutting means. Thus, the additional strength provided by the tongue and groove connection is marginal, when screws are used to hold the cutting elements.

Another disadvantage of known core drills results from the fact that they come in various diameters. It can be expensive, both to manufacture, and to keep a supply of new circular cutting means of various sizes on hand, to replace worn or broken cutting means, of different sizes.

It is one purpose of the present invention to provide an improved core drill, and a component therefor, which is stronger than known drills, and more particularly, a core drill in which the cutting means does not separate as readily from the drill tube.

It is another purpose of the present invention to provide an improved core drill in which the cutting means of the core drill can be accurately positioned on the end of the drill tube, and attached thereto, without requiring the use of complicated and expensive locating jigs.

It is a further purpose of the present invention to provide an improved core drill which is relatively inexpensive, can be readily manufactured, and can be readily reconstructed with new cutting means.

It is yet another purpose of the present invention to provide a standard core drill cutting component pluralities of which can be used on core drills of various sizes to provide suitable cutting means. The standard cutting component comprises a relatively short, straight, cutting element. A plurality of the cutting elements are mounted substantially end-to-end in a circle on the end of the drill tube. The short length of the straight cutting element permits it to closely approximate the short curved element of the circular end of the drill tube on which it is mounted. The same sized elements can be used on small or large drill tubes with only the number of elements used varying.

In accordance with one embodiment of the present invention there is provided a cutting means for use in a core drill which cutting means is curved to have approximately the same curvature as the curvature of the end surface of the carrying member to which it is to be attached.

The end surface of the cutting means, which is to be abutted against one end of the carrying member has structural means along its entire length adapted to mate with the one end of the carrying member.

The cutting means, in the one embodiment, preferably comprises a circular, or nearly circular, member and the structural means comprises a circular, or nearly circular, groove on the end surface of the member. The groove preferably is V-shaped.

The present invention is also directed toward a core drill employing the above cutting means. The core drill comprises a carrying member, and cutting means attached thereto, said cutting means having an end surface adapted to be abutted against an end of the carrying member. The cutting means has approximately the same curvature as the end of the carrying member. Structural means are provided along the entire length of the said end surface of the cutting means for mating with the end of the carrying member.

The carrying member comprises a cylindrical tube and the cutting means comprises a circular, or nearly circular, ring. The structural means comprises a circular, or nearly circular, groove on the cutting means. The groove preferably is V-shaped.

The core drill, particularly when employing the nearly circular cutting means, is assembled by abutting the circular ring segment and tube together. The end of the tube has a mating V-shape to fit in the V-shaped groove cut into one end of the circular ring segment. The V-shaped groove can be precisely positioned in the circular ring segment relative to the outer circular cutting surface of the ring segment. When the ring segment is fitted onto the end of the tube, the outer circular cutting surface of the ring is accurately located relative to the outer surface of the tube. If necessary, the ring segment can flex slightly to snugly receive the V-shaped end of the tube within the groove. The depth of the groove is not too critical since the V-shaped end of the tube will always fit into the middle of the groove, thus accuratly locating the circular cutting surface of the ring segment with respect to the outer surface of the tube. The ring segment and the tube are tightly held together and then joined by brazing or other suitable means.

The core drill is easily reconstructed by removing the ring segment from the tube by applying heat to the brazed joint and brazing a new ring segment to the tube. The core drill can also be easily reconstructed by cutting the tube, adjacent the ring, and discarding the cut-off part. The cut end of the tube is then machined to a V-shape to fit the grove of a new cutting means which is fastened to the tube.

In another embodiment of the present invention, the invention is directed toward cutting means for use in a core drill which comprises a short, straight, cutting element. The element has an end surface by which it is adapted to be joined to a short portion of one end of a carrying member. Straight, structural means are provided along the entire length of the one end surface of the element for receiving the portion of the one end of the carrying member when fastened thereto.

The invention is also directed toward a drill tube employing a plurality of the short, straight cutting elements.

The invention will now be described in detail having reference to the accompanying drawings in which.

Figures 1, 2, 3, 4, 5, 6:
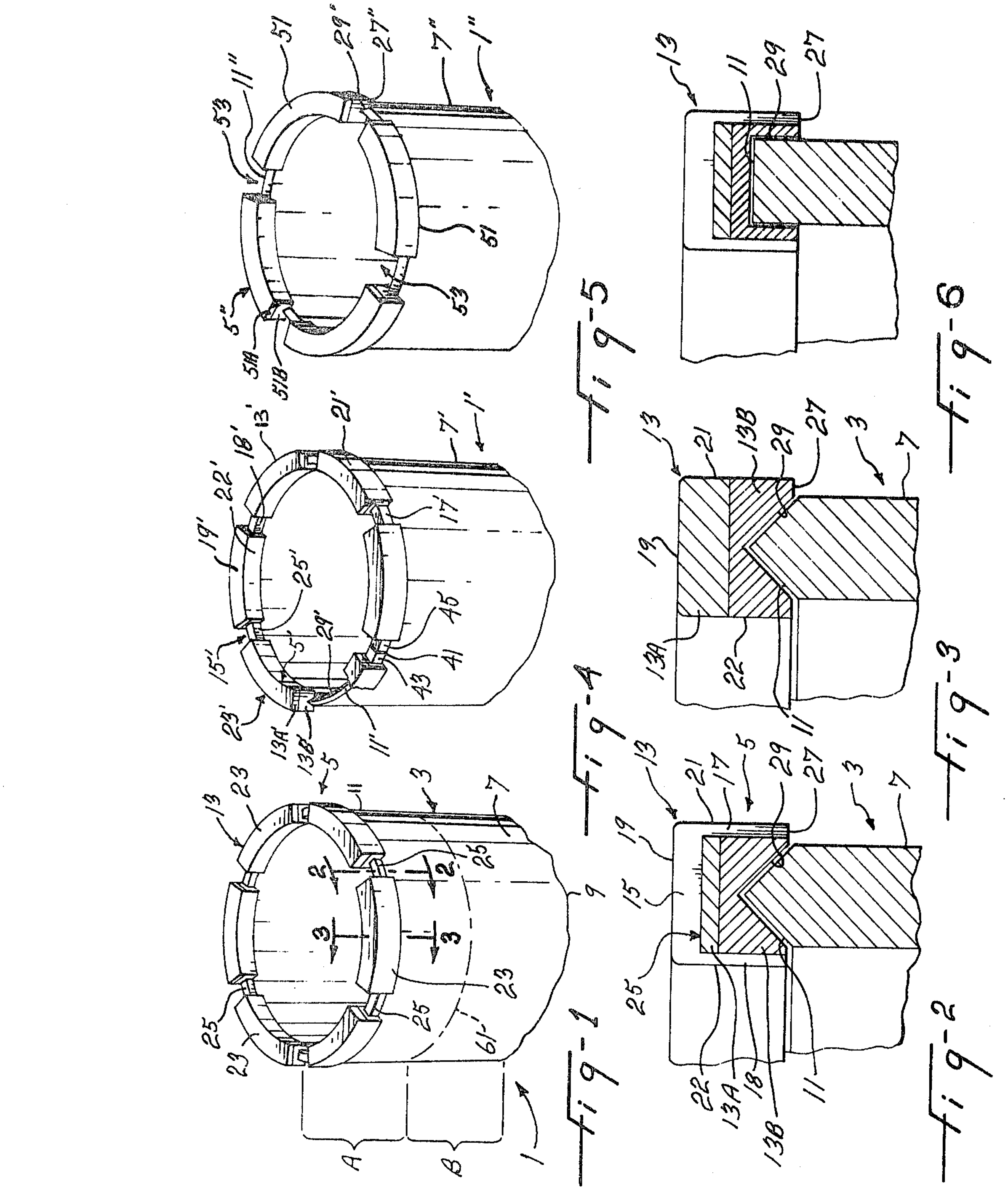
FIG. 1 is a perspective view of the core drill.
FIG. 2 is a cross-section view of the core drill taken along line 11—11 of FIG. 1.
FIG. 3 is a cross-section view of the core drill taken along line 111—111 of FIG. 1.
FIG. 4 is a perspective view of a preferred embodiment of the core drill.
FIG. 5 is another perspective view of still another embodiment of the core drill.
FIG. 6 is a cross-section view, similar to FIG. 2, showing another embodiment of the core drill.

The core drill 1 of the present invention comprises a carrying member 3 and cutting means 5 fastened to one end of the carrying member. The carrying member 3 preferably comprises cylindrical drill tube 7. One end 9 of the tube 7 is adapted to be detachably connected to a drilling machine (not shown) which operates the core drill 1. The one end 9 may be threaded (not shown) for attachment to the drilling machine, or it may be attached by any other suitably, detachable connecting means.

In one embodiment of the invention, the cutting means 5 comprises at least one cutting member having a curvature approximately the same as the curvature of the other end 11 of the tube 7. In the embodiment shown in FIGS. 1, 2 and 3, the cutting member is a circular ring 13. The ring 13 as shown in FIGS. 2 and 3 preferably comprises an outer portion 13A which is made of hard, cutting material, and an inner portion 13B which is made of softer material and which provides a backing for the cutting material portion 13A. The outer portion 13A can comprise, by way of example, a mixture of diamond chips, cobalt and/or tungsten molded together with a suitable bonding material. The inner portion 13B can comprise readily machinable material such as steel.

The ring 13 preferably has an outer diameter slightly greater than the outer diameter of tube 7 and an inner diameter of tube 7 and an inner diameter slightly less than the inner diameter of tube 7. A number of radial and longitudinal grooves 15, 17, 18 are formed in one end surface, outer surface and inner surface 19, 21, 22 respectively of the ring 13. These grooves 15, 17, 18 divide the ring 13 into circular segments 23 joined by links 25.

Structural means are provided in the other end surface 27 of the ring 13 for snugly receiving the end 11 of the tube 7. These structural means can comprise a circular groove 29. The groove 29 preferably is V-shaped, and the end 11 of the tube 7 has matching V-shape. The groove 29 preferably is located centrally in the end surface 27 although it can be located nearer to the inner surface 22 of the ring 13 than to the outer surface 21 if desired to provide more available cutting material on the outside of the ring. The groove 29 is located in the inner portion 13B which is readily machinable.

The V-shaped end 11 of the tube 7 is fitted within mating V-shaped groove 29 in ring 13 and the tube and ring are joined together by brazing or other suitable means. The groove 29 serves to properly locate the ring on the tube without the need of any special jigs or holders. The groove, regardless of its depth, accurately locates the inner and outer cutting surfaces 21, 22 relative to the inner and outer surfaces of the tube. The use of the V-shaped groove 29 also provides for tolerances in the manufacture of the ring, since the groove can be made somewhat deeper or shallower than required, and still properly fit on the V-shaped end of the tube.

When using the drill 1, the one end 19, and inner and outer surfaces 22, 21 of ring 13 do the cutting. When surfaces 19, 22 or 21 wear down, the ring 13 is replaced as will be described. The grooves 15, 17 and 18 permit cooling and flushing fluid to be circulated from within the tube, out around the outer end of the drill, and back up its outer surface.

In a preferred embodiment of the invention as shown in FIG. 4, the cutting means 5′ on core drill 1′ can comprise a nearly circular ring segment 13′. The segment 13′ can be formed by cutting a narrow portion out of ring 13. The slot 41 formed by the cut-out portion allows the ends 43, 45 of the ring segment 13′, which is slightly flexible, to be moved slightly together or apart thus changing the diameter of the circular ring segment. This permits the ring segment 13′ to be fitted onto tubes 7′ having slightly varying diameters. The construction of ring segment 13′ is substantially similar to that of ring 13. The ring segment 13′ has an outer, hard cutting material portion **13*a*′ and an inner mounting material portion 13*b*′. Ring segment 13′ has radial and longitudinal grooves 15′, 17′, 18′ in its one end surface and outer and inner surfaces 19′, 21′, 22′ respectively dividing the ring into circular cutting segments 23′. Ring segment 13′ further has a V-shaped groove 29′ formed in, and extending along, the entire face of its other end 27′ which groove receives the V-shaped end 11′ of tube 7′. The groove 29′ is machined in the mounting material portion 13B′ of the ring. Slot 41 is normally formed by cutting out a portion, or all, of a link portion 25′**.

To mount ring segment 13′ on tube 7′, the ends 43, 45 are adjusted to have the ring segment 13′ fit the end 11′ of tube 7′ with groove 29′ snugly receiving the end 11′. The tube 7′ and ring segment 13′ are then held tightly together while being joined by silver brazing.

While the cutting means 5′ has been described as a ring with a single slot wherein, it can also comprise a ring having two or more cuts in it to divide it into segments particularly if the ring has a large diameter.

In another embodiment, the drill core 1″ has cutting means 5″ which comprises a number of individual circular cutting segments 51 as shown in FIG. 5. The cutting segments 51 in this embodiment are arranged in spaced-apart relation about the other end 11″ of the tube 7″. Each segment 51 might extend, for example, over an arc of 60° and if four segments 51 were used, the gap 53 between adjacent segments 51 would be 30°. The gaps 53 allow lubricating and cooling fluid to flow outwardly from within the core drill 1″. The end 11″ of the tube 7″ is V-shaped. Each segment 51 has a curved, V-shaped groove 29″ on its end 27″ mating with a portion of tube end 11″. The segments 51 are attached to tube 7″ by silver brazing. The use of segments 51 permits the pressure to be applied to the cutting face of core drill 1″ to be varied in comparison to previous core drills 1 or 1′ since the same applied force can be distributed over a larger or smaller working area depending on the number of segments 51 used. Each segment 51 preferably has a hard, outer cutting portions 51A and a softer, inner mounting portion 51B in which groove 29″ is formed.

While the groove 29, 29′, 29″ has been preferably described as being V-shaped, it can also be made U-shaped, as shown in FIG. 6, to receive the end 11, 11′, 11″ of tube 7, 7′, 7″. In this embodiment, the end of the tube obviously need not be machined to a V-shape. One drawback to using a U-shaped groove however is that the wall thickness and diameter of the tube is not always uniform and since the groove would have to be cut to the widest wall thickness, a good fit for brazing would not always be obtained.

Figure 8:
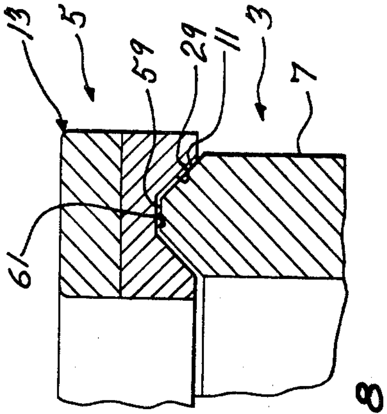
FIG. 8 is a cross-section view, similar to FIG. 3 showing yet another embodiment of the core drill.
Figure 7:
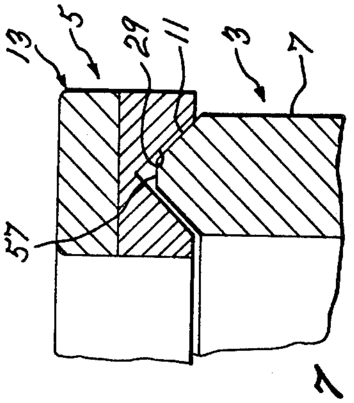
FIG. 7 is a cross-section view, similar to FIG. 3 showing a further embodiment of the core drill.

Further variations can be made in the mating surfaces between the carrying tube and the cutting means. As shown in FIG. 7 the V-shaped end 11 of the tube 7 can be flattened as shown at 57. Alternatively, as shown in FIG. 8, both the V-shaped end 11 of tube 7 and the bottom of groove 29 (or grooves 29′, 29″) can be flattened as shown at 59, 61 respectively.

In all the embodiments shown, when the cutting means 5, 5′, 5″ has been worn down, replacement is simple. The cutting means can be replaced in one of two ways. One way, as shown in FIG. 1, is to cut the tube 7 adjacent the cutting means 5, along imaginery line 61 and the cut-off, worn part "A" is discarded. The cut end of the remaining part "B" of tube 7 is then machined to provide a new V-shaped circular rib thereon. A new cutting means 5, 5′ or 5″ is then brazed on, the new cutting means being formed with a groove therein to mate with all or a part of the new rib on the tube. This manner of replacement is used if the end of the tube is worn or damaged. The worn cutting means 5, 5′ or 5″ can also be replaced by merely heating up the brazed joint joining the cutting means to the end of the cylinder so that the old cutting means can be removed. A new cutting means is then fitted to the end of the cylinder and secured by brazing.

Figure 9:
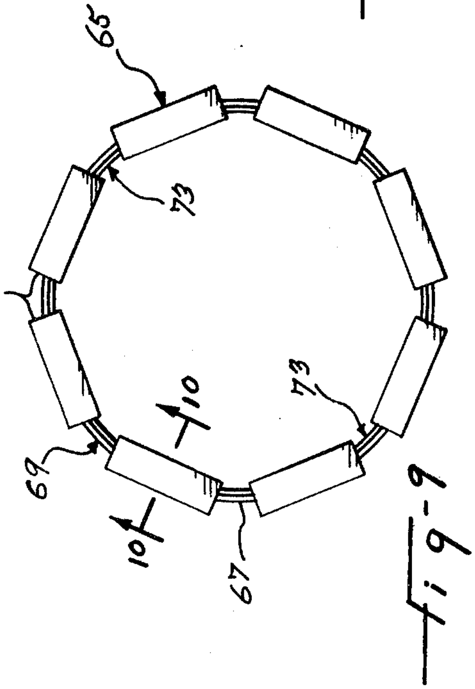
FIG. 9 is a plan view of a still further embodiment of the core drill.

In all the embodiments described so far, the cutting means 5, 5′ or 5″ have been curved. The present invention, in one embodiment, also employs short, straight cutting elements. These straight elements 65, as shown in FIG. 9, are arranged substantially end-to-end in a circle on the end 67 of a cylindrical drill tube 69. The adjacent ends 71 of adjacent cutting elements 65 are spaced slightly apart to provide generally radial equal sized gaps 73 between adjacent elements. The gaps 73 provide means for circulating cooling fluid radially outwardly from within the drill tube 69.

Figure 10:
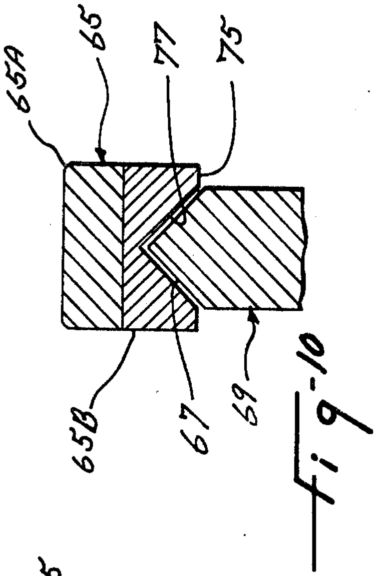
FIG. 10 is a cross-section along 10—10 of FIG. 9.

Each cutting element 65 has structural means on one surface 75 by means which the element 65 is attached to the end of the tube 69. The structural means, as shown in FIG. 10, comprises a straight V-shaped groove 77 generally centrally located, longitudinally of the one surface 75 of the element. The element 65 is mounted on the circular end 67 of tube 69, which end is also V-shaped, so that the end 67 fits within groove 77. This fit is not exact however because the groove 77 is straight while the mating end portion of the tube is curved. However, because the elements 65 are so short, relative to the diameter of the drill tube, the fit is close enough to properly locate and attach the elements to the tube end. The elements 65 can, as before, be attached by brazing or other suitable means.

Each element 65 preferably has a hard, outer cutting portion 65A, and a softer, inner mounting portion 65B in which groove 77 is formed. While the mating structural means on the elements and the tube end have been shown as V-shaped, they can also be of the forms shown in cross-section in FIGS. 6, 7 or 8.

The use of the short, straight, cutting elements 65 permits them to be used with any sized drill tube to provide its cutting means. With a small diameter tube, fewer elements 65 are employed. With a larger diameter tube, more elements 65 are used. To fit the elements 65 on the end of the drill tube, regardless of its size, the spacing or gap size between the elements can be varied. Thus only one type of replacement element need be carried to fit all drill tubes, provided that the mating structural mounting means are the same on all the tubes and on the cutting elements.

The embodiments of the invention in which an exclusive property or privilege is claimed are defined as follows:

1. Cutting means for use in a core drill comprising a circular ring having opposed annular end walls, inner and outer concentric side walls joining the end walls, one end portion of the ring composed of hard cutting material, the other end portion composed of softer support material, a V-shaped circular attachment groove in the annular end wall of the ring located in said other end portion of the ring, a set of opposed groove pairs in the inner and outer side walls extending between the annular end walls, a radial groove connecting each pair of opposed grooves, the radial grooves being located in the annular end wall in the one end portion, and a radial slot extending completely through the ring, the slot being located in one of the radial grooves.

* * * * *